(12) United States Patent
Kitano et al.

(10) Patent No.: US 7,539,482 B2
(45) Date of Patent: May 26, 2009

(54) APPARATUS FOR SENDING AND RECEIVING INFORMATION WITH WIRELESS COMMUNICATION

(75) Inventors: Satoshi Kitano, Hokkaido (JP); Naoki Gorai, Hokkaido (JP); Koki Hayashi, Hokkaido (JP); Koichi Kishida, Kanagawa (JP)

(73) Assignee: Kabushikikaisha Equos Research (JP)

( * ) Notice: Subject to any disclaimer, the term of this patent is extended or adjusted under 35 U.S.C. 154(b) by 975 days.

(21) Appl. No.: 10/996,430

(22) Filed: Nov. 26, 2004

(65) Prior Publication Data

US 2005/0110654 A1 May 26, 2005

(30) Foreign Application Priority Data

Nov. 26, 2003 (JP) ............................. 2003-394926
Nov. 26, 2003 (JP) ............................. 2003-394927

(51) Int. Cl.
 *H04M 1/725* (2006.01)
(52) U.S. Cl. .................................. 455/412.1; 709/200
(58) Field of Classification Search ........................ None
See application file for complete search history.

(56) References Cited

U.S. PATENT DOCUMENTS

2003/0135538 A1* 7/2003 Takeuchi et al. ............ 709/200

FOREIGN PATENT DOCUMENTS

JP 2001-136190 5/2001

OTHER PUBLICATIONS

English language Abstract of JP 2001-136190.

* cited by examiner

*Primary Examiner*—Erika A Gary
(74) *Attorney, Agent, or Firm*—Bacon & Thomas, PLLC

(57) ABSTRACT

An apparatus for sending and receiving information to and from a plurality of other apparatuses with wireless communications is disclosed. The apparatus includes: information storage means which stores various information; summary creating means for creating a summary of each of the various information stored in the information storage means; summary information delivering means for delivering summary information including at least a part of the summaries and identification data of the apparatus to the plurality of other apparatuses; request information receiving means for receiving request information including the identification data of the apparatus, identification data of the other apparatus and a request to send entire information of one or more summaries from any one of the plurality of other apparatuses; and entire information sending means for sending the requested entire information of the summaries to the other apparatus in response to the request using the identification data of the other apparatus.

7 Claims, 4 Drawing Sheets

APPARATUS FOR SENDING AND RECEIVING INFORMATION WITH WIRELESS COMMUNICATION

CROSS-REFERENCE TO RELATED APPLICATION

This application claims priority to Japanese Patent Applications No. 2003-394926 and No. 2003-394927 both filed Nov. 26, 2003, which are hereby expressly incorporated by reference herein in its entirety.

FIELD OF THE INVENTION

The present invention relates to an apparatus for sending and receiving information (that is, data) with wireless communications mounted on a vehicle which can send and receive information stored therein to and from another apparatus or other apparatuses.

BACKGROUND OF THE INVENTION

For example, a vehicle provided with an apparatus capable of executing various information processing such as route guidance on the basis of geographic data becomes widely used. The vehicle provided with such an information processing apparatus may send and receive various information such as traffic information, geographic information, route information, image information, and music information to and from various types of information sending and receiving apparatus such as an information delivering center or other vehicle provided with such an information processing apparatus with wireless communications. In the case of sending and receiving data (information) to and from the information delivering center or other vehicle, it is common to carry out data communications by a client server system, by which data (information) is centrally controlled using an in-vehicle telephone or a cellular phone (mobile phone) connected to the apparatus. In addition, a method of carrying out data communications between vehicles with a wireless LAN (local area network) has already been proposed (see Japanese Laid-Open Patent Application No. 2001-136190).

However, there is a problem that the communication costs are expensive in the case of data communication system using in-vehicle phones or cellular phones because such a system to account based on the amount of packets while sending and receiving data (information) is normally utilized. Further, the communication speed of such a phone that has already been put to practical use is low speed (for example, currently, the maximum speed thereof is 384 kbps (kilo bit/second), and an area where the apparatuses can communicate with each other is limited to an available area of such a phone. Moreover, the developing and operating costs for a server in a client server system are required.

On the other hand, in the case of the method using a wireless LAN, there is an advantage (merit) that no costs for development of a server and no communication costs are required. However, since data transmission (data sending and receiving) between particular vehicles is assumed, only information (data) to be sent and received is sent and received when the data transmission between the vehicles is carried out separately, and therefore information that an arbitrary vehicle possesses (that is, information stored in information storage means such as memory of an arbitrary vehicle) cannot be obtained.

Further, most data communications between vehicles are carried out while the vehicles are moving independently, and therefore a time when each of two vehicle carrying out data transmission resides in a data transferable area may be short in the case where the data transmission is carried out while the vehicles are moving. For this reason, the event that the data transmission cannot be terminated completely may occur quite frequently. In that case, since data that has already received is incomplete, it is required that the corresponding data is obtained again from another vehicle or the like. Further, if the data transmission cannot be terminated completely even in this case, such a data transmitting operation may be repeated, and it is thus inefficient.

SUMMARY OF THE INVENTION

It is therefore one object of the present invention to provide an apparatus for sending and receiving information with wireless communications that can send (deliver) information held in the apparatus to a large number of other apparatuses respectively mounted on a large number of vehicles efficiently.

Further, it is another object of the present invention to provide an apparatus for sending and receiving information with wireless communications that can receive necessary information in various information that an arbitrary vehicle has (possesses) from the arbitrary vehicle efficiently.

Moreover, it is still another object of the present invention to provide an apparatus for sending and receiving information with wireless communications that can receive information stored in other apparatus from the other apparatus efficiently.

In order to achieve the above objects, the present invention is directed to an apparatus for sending and receiving information with wireless communications. In one embodiment of the present invention, the apparatus is capable of sending and receiving various information to and from a plurality of other apparatuses for sending and receiving information with wireless communications. The apparatus of the present invention includes:

information storage means which stores various information;

summary creating means for creating a summary of each of the various information stored in the information storage means, the summary being a brief explain for contents corresponding to each of the various information;

summary information delivering means for delivering summary information to the plurality of other apparatuses, the summary information to be delivered including at least a part of the summaries created by the summary information creating means and identification data of the apparatus;

request information receiving means for receiving request information from any one of the plurality of other apparatuses which received the delivered summary information, the request information including the identification data of the apparatus contained in the delivered summary information, and the request information also including identification data of the other apparatus and a request to send entire information of one or more summaries in the received summaries that the other apparatus hopes to have entire information thereof; and entire information sending means for sending the requested entire information of the summaries to the other apparatus in response to the request using the identification data of the other apparatus.

According to the present invention, the apparatus is constructed so as to deliver the summary information, which includes at least a part of the summaries created by the summary creating means and identification data of the apparatus, to the plurality of other apparatuses respectively mounted on a plurality of vehicles with the wireless communications, and to send the requested entire information in response to the request of the other apparatus. Therefore, it is possible to send information stored in the information storage means of the apparatus to a large number of other apparatuses respectively mounted on a large number of vehicles efficiently.

In the apparatus of the present invention, it is preferable that the one or more summaries are determined in the other apparatus by comparing the delivered summaries with various information stored in information storage means of the other apparatus.

Further, in the apparatus of the present invention, it is preferable that the wireless communications are carried out using a wireless local area network.

Further, in another embodiment of the present invention, the apparatus of the present invention includes:

information storage means capable of storing various information;

summary creating means for creating a summary of each of the various information stored in the information storage means, the summary being a brief explain for contents corresponding to each of the various information;

summary information receiving means for receiving summary information of various information delivered by any one of the plurality of other apparatuses with the wireless communications, the received summary information including identification data of the other apparatus and at least a part of summaries of the various information stored in information storage means of the other apparatus, and the summary information being created by summary information creating means of the other apparatus based on the various information stored in the information storage means thereof;

request information creating means for creating request information, the request information including identification data of the apparatus and a request against the other apparatus to send entire information of one or more summaries in the received summaries to the apparatus, in which the request is created by comparing the received summaries with the summaries created by the summary information creating means of the apparatus to extract one or more summaries of which entire information is not stored in the information storage means of the apparatus;

request information sending means for sending the thus created request information to the other apparatus using the identification data of the other apparatus; and entire information receiving means for receiving the entire information of the requested summaries from the other apparatus.

According to the present invention, the apparatus is constructed so as to create the request information by comparing the summaries in the summary information received from the other apparatus with the summaries created by the summary creating means of the apparatus, to send the request information to the other apparatus and to receive the entire information corresponding to the request information from the other apparatus. Therefore, it is possible to receive necessary information in various information that an arbitrary vehicle has from the arbitrary vehicle efficiently.

Further, it is preferable that the apparatus further includes incomplete information storage means for storing a portion of the entire information that has been already received from the other apparatus as incomplete information in the event that interruption of the wireless communications occurs when receiving the entire information by the entire information receiving means, the incomplete information being stored in the incomplete information storage means in association with incomplete identification that indicates the stored information is incomplete information, wherein the request information sending means requests to send the remaining portion of the entire information to the apparatus when a summary of the entire information of which incomplete information is stored in the incomplete information storage means in association with the incomplete identification is contained in the received summary information.

According to the present invention, the apparatus is constructed so as to store a portion of the entire information that has been already received from the other apparatus as incomplete information in the event that interruption of the wireless communications occurs while receiving the entire information and to request to send a remaining portion of the entire information to the apparatus in the case where the summary of the incomplete information is contained in the received summary information from the other vehicle. Therefore, it is possible to receive information stored in the other apparatus from the other apparatus efficiently.

In this case, it is preferable that, in the case where a request to send the remaining portion of the entire information exists as well as a request to send the entire information, the request information sending means gives priority to the request to send the remaining portion of the entire information rather than the request to send the entire information.

Further, in the apparatus of the present invention, it is preferable that the wireless communications are carried out using a wireless local area network.

BRIEF DESCRIPTION OF THE DRAWINGS

The foregoing and other objects, features and advantages of the present invention will become more readily apparent from the following detailed description of preferred embodiments of the present invention which proceeds with reference to the accompanying drawings.

DETAILED DESCRIPTION OF THE INVENTION

Figure 1:
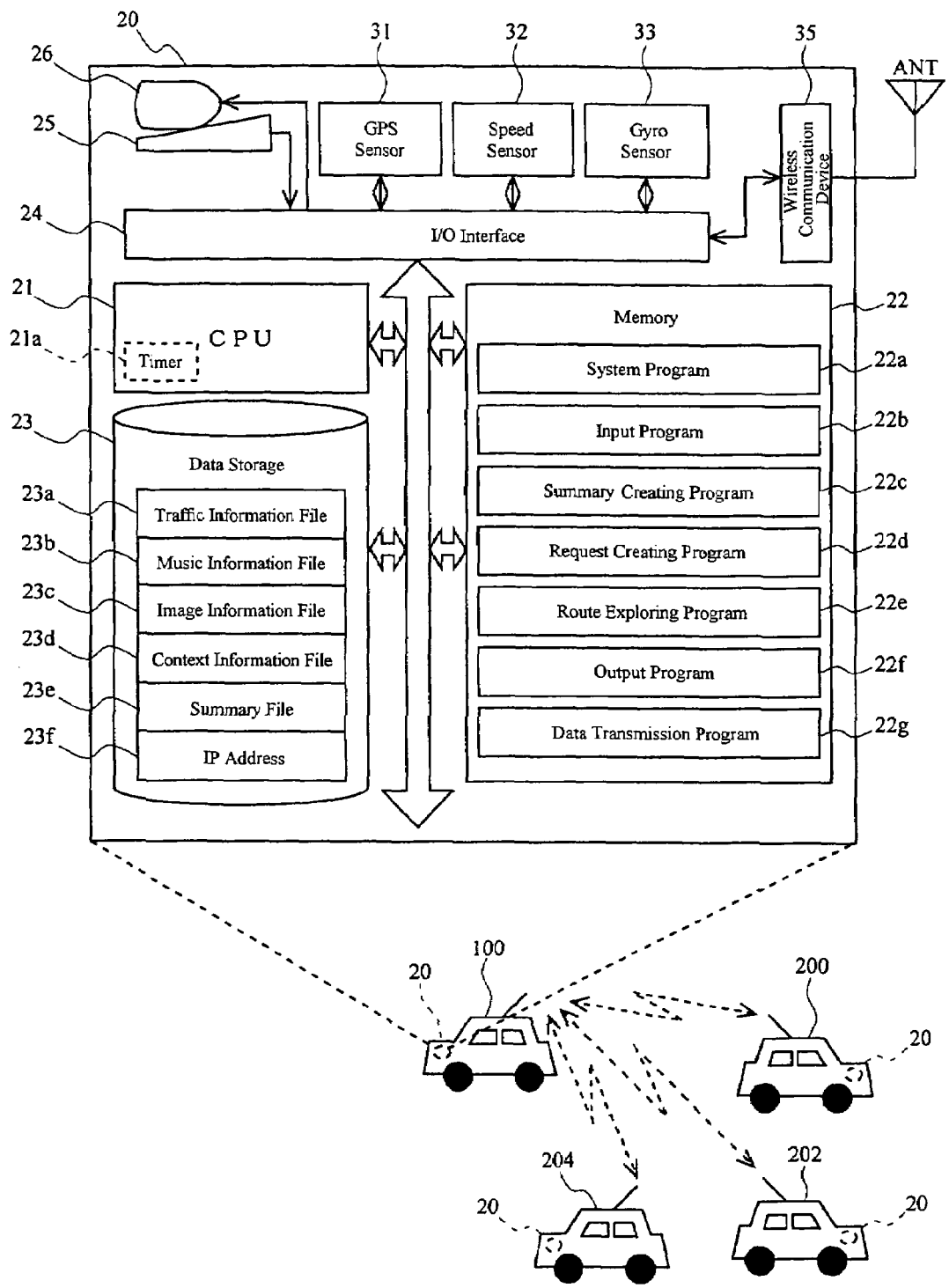
FIG. 1 is a schematic block diagram of a vehicle-mount type navigation apparatus to which an apparatus for sending and receiving information with wireless communications of the present invention is applied.

A detailed description will now be given for an apparatus for sending and receiving information (that is, data) with wireless communications according to the present invention that is applied to a vehicle-mount type navigation apparatus in one embodiment with reference to the accompanying drawings (FIGS. 1-4).

(1) Summary of Embodiment

In this embodiment, a navigation apparatus 20 mounted on each vehicle 100, 200, 202, 204 serves as an apparatus for sending and receiving information with wireless communications. Each navigation apparatus 20 sends and receives various contents (various information such as traffic information, geographic (map) information, music information, image information, and context information) stored in a data storage to and from each other by data transmission using a wireless local area network (LAN). At this time, an apparatus for sending and receiving information (that is, data) with wireless communications A (hereinafter, referred to simply as "apparatus A") that carries out a sending operation (that is, the apparatus A serves as an information sending side apparatus) delivers summary information including summaries (each of the summaries is a brief explain for contents corresponding to each of the various information) of whole or a part of contents stored in the data storage of the apparatus A (for example, time and location of the traffic information) and an IP address (identification data) of the apparatus A to a plurality of other apparatuses for sending and receiving information with wireless communications with broadcast communications by means of the wireless LAN every time the conditions such as a predetermined time interval or the like are satisfied (See FIG. 2). In this regard, the data transmission to the plurality of other apparatuses is not limited to the broadcast communications, and transmission by multicast communication or transmission to all the apparatuses by wild card address may be mentioned.

An apparatus for sending and receiving information with wireless communications which is mounted on a vehicle existing (residing) in an area capable of carrying out wireless LAN communications (hereinafter, referred to simply as "apparatus B) serves as an information receiving side apparatus, and determines contents to be obtained in the contents that the apparatus B does not possess in a predetermined manner (for example, order of favorites or order of priority) in the received summary information. The information receiving side apparatus B sends request information (including a request for the determined contents and an IP address of the apparatus B) to the information sending side apparatus A with unicast communications. Hereinafter, the apparatuses A and B send and receive the requested contents with unicast communications while they exist in the area where they can communicate with each other. Since the function of sending and receiving information between the apparatuses A and B is equivalent, the transmission of information from the apparatus B to the apparatus A or an apparatus C having a similar function can be carried out.

In the case where the wireless communications are terminated because they are out the area where any of them can communicate with each other while sending and receiving information, the apparatus B during receiving information stores information that has been already received in association with the corresponding summary to which incomplete identification that indicates the already-received (incomplete) information is incomplete is appended (that is, as incomplete information). Then, in the case where the summary included in the summary information that is received again from other apparatus (which may be the apparatus A from which a part of the information has been received or another apparatus) corresponds with the summary to which the incomplete identification is appended, that is, in the case where the summary of the contents of which a part has been received is received from any one of the plurality of other apparatuses (for example, sending side apparatus D), the apparatus A requests the corresponding apparatus (sending side apparatus D) to send only a remaining portion (not received portion) of the information (contents) to the apparatus A to receive the remaining portion of the information.

(2) Detail Description of Embodiment

FIG. 1 is a block diagram showing the structure of the navigation apparatus 20. As shown in FIG. 1, the navigation apparatus 20 is mainly provided with a CPU (central processing unit) 21, a memory 22, a data storage 23, an input/output (I/O) interface 24, an input device 25, a display 26, a GPS (global positioning system) sensor 31, a speed sensor 32, a gyro sensor 33, a wireless communication device 35, a speaker and a RAM (random access memory) (not shown in the drawings) and the like.

In this regard, the navigation apparatus 20 of the present embodiment functions (serves) as an apparatus for sending and receiving information with wireless communications according to the present invention, but the apparatus of the present invention may be mounted on a vehicle independently of the navigation apparatus. In this case, the navigation apparatus and the apparatus of the present invention are constructed to operate in cooperation with each other and to allow data (information) to be inputted and outputted between them. For example, the navigation apparatus outputs detected positional information or the like to the apparatus of the present invention in response to a request from the apparatus of the present invention.

The CPU 21 is used for controlling the whole of the navigation apparatus 20, and is connected to the memory (program storage means) 22, the data storage (information storage means) 23, the input/output interface 24 and the like via a system bus. Various control programs 22b to 22f and the like are stored in the memory 22 in addition to a system program 22a for controlling the CPU 21 to operate the navigation apparatus 20. The CPU 21 functions as a part of means for achieving various functions such as information storage means, summary creating means, summary information delivering means, request information receiving means, entire information sending means, summary information receiving means, request information creating means, request information sending means, entire information receiving means, and incomplete information storage means. In this embodiment, a timer 21a that has a function of outputting data of current date and time is housed in the CPU 21. The timer 21a may be omitted in the case where the data of current date and time can be obtained via the GPS sensor 31.

The memory 22 is a type of semiconductor memory device to be connected to the system bus, and constitutes a main memory space that the CPU 21 uses. As shown in FIG. 1, an input program 22b, a summary creating program 22c, a request creating program 22d, a route exploring program 22e, an output program 22f, data transmission program 22g and the like are stored in the memory 22 in addition to the system program 22a.

The input program 22b is a program capable of inputting data (information) from the input device 25. The summary creating program 22c is a program for creating a summary of each of contents (information) in a data file. The request creating program 22d is a program for creating request information on the basis of the received summary information (including summaries and IP address (that is, identification data) of the sending side apparatus).

The route exploring program 22e is a program for exploring a drive route from a departure place to a destination, which is a basic function of the navigation apparatus 20. More specifically, the route exploring program 22e has a function of exploring a destination inputted from the input device 25 on the basis of geographic information stored in a geographic information database (not shown), and a function of exploring a recommended route from a departure place inputted from the input device 25 or a present location of the vehicle detected by the GPS sensor 31 and the like to the desired destination on the basis of route information stored in the geographic information database. In this case, the route exploration is carried out by shortest path exploring algorism such as a Dijkstra method.

The output program 22f is a program for achieving a function of displaying route guidance information, sending setup information of the data file and the like on the display 26 as a diagram or a letter string, and a function of displaying or outputting from the speaker the contents of the received summary information.

The data transmission program 22g is a program for sending and receiving (transmitting) various data (such as summary information, request information, and requested information (contents)) to and from other apparatus through the wireless LAN. As for other programs (not shown in the drawings), a route guidance program for guiding the drive route explored by the route exploring program on the basis of the present location of the vehicle through audio output or image display (such as display of geographic information on which the explored route is indicated, and display of intersections and a moving direction of the vehicle) may be mentioned.

The data storage 23 constitutes a preliminary memory space that the CPU 21 uses. The data storage 23 is formed from a drive device that can deal with at least one of various storage media such as a hard disk (HD), a compact disc (for example, CD-R, CD-RW), a magneto optical disk (MO), a digital versatile disc (for example, DVD-R, DVD-RW, DVD-RAM), semiconductor memory and the like. The data storage 23 is also connected to the CPU 21 via the system bus.

A traffic information file 23a, a music information file 23b, an image information file 23c, a context information file 23d, a summary file 23e, an IP address 23f and various other data are stored in the data storage 23 to be selected as a plurality of data files. These data files include data files pre-stored in the data storage 23, and data files stored in the data storage 23 after receiving them from the other apparatus mounted on other vehicle 202 or 204 or an information delivering center (not shown in the drawings).

The I/O interface 24 is a device for intermediating data transfer between the CPU 21 and the input/output device such as the input device 25, the display 26, the GPS sensor 31, the speed sensor 32, the gyro sensor 33, and the wireless communication device 35, and is connected to the system bus.

The input device 25 is provided on an operation panel of the navigation apparatus 20, and is connected to the system bus via the I/O interface 24. The input device 25 is a device for inputting information on a destination that the user thereof hopes to carry out route exploration via the input program 22b, and for inputting setup information on a sending process of a data file. The input device 25 normally has a structure in which a predetermined number of press-type switches are arranged on the surface thereof. However, in consideration of the simplification of an input operation thereof, the input device 25 may be constructed to be touch panel type one provided on the surface of the display 26 or may be formed from a microphone for recognizing the voice of the user thereof and a voice recognition device that converts the recognized voice into input information into the navigation apparatus 20.

The display 26 is provided on the operation panel of the navigation apparatus 20, and can output (display) a recommended guidance route from a departure place to a destination, sending setup information of the data file, and the like via the output program 22f. The display 26 is also connected to the system bus via the I/O interface 24, and is constructed from a liquid crystal display (LCD) or a CRT (cathode-ray tube) display, for example. Further, a touch panel constituting the input device 25 may be provided on the surface of the display 26.

In this regard, although the input device 25 and the display 26 are provided on the operation panel of the navigation apparatus 20 in the present embodiment, the present invention is not limited thereto. For example, the input device 25 and the display 26 may be provided in another housing other than that of the navigation apparatus 20. Alternatively, the input device 25 may be physically separated from the display 26 with each other.

The GPS sensor 31 is also connected to the system bus via the I/O interface 24, and is used for outputting current positional data of the vehicle on the basis of the longitude and latitude of the vehicle. The GPS sensor 31 is constructed from a GPS receiver for receiving signals form a plurality of GPS satellites to measure (or detect) the absolute position of the user thereof.

On the other hand, the speed sensor 32 and the gyro sensor 33 are used for measuring the relative position of the vehicle, and are also connected to the system bus via the I/O interface 24, respectively. These sensors 32, 33 are used for autonomous navigation of the vehicle, and the relative position measured by the sensors 32, 33 is used to obtain the position of the vehicle in a place where the GPS receiver cannot receive radio waves from the GPS satellites (for example, inside of a tunnel), or to correct the positioning error in the absolute position measured by the GPS sensor 31.

The wireless communication device 35 is a wireless LAN communication device for sending and receiving data (information) between the vehicle 100 and other vehicles 200, 202, 204 with wireless communications, and is also connected to the system bus via the I/O interface 24. The wireless communication device 35 uses a wireless LAN communication system by spread spectrum communication. In this case, a communication mode of one-to-n type (n is a plural number) with broadcast communications or multicast communications in which an area where vehicles each provided with the navigation apparatus 20 can communicate with each other is in the range of a radius of 200 meter to 1 km is adopted. By using a summary creating process of data files and an information transmitting process (described later), it is possible to broadcast summary information of the contents that the vehicle holds (or has) to a plurality of other apparatuses for sending and receiving information with wireless communications effectively.

Further, in the wireless LAN communication system by the wireless communication devices 35, in the case of sending request information to other apparatus (for example, the navigation apparatus 20 of the vehicle 200), one-on-one type communication is carried out with unicast communications at which the IP address included in the received summary information is specified. In addition, in the case of sending requested entire information (contents) to the navigation apparatus 20 of the vehicle 100, unicast communications at which the IP address included in the received request information is specified is carried out.

In this regard, the symbol ANT shown in FIG. 1 is an antenna connected to the wireless communication device 35, and adopts a space diversity system, for example.

Next, a description will be given for a method of sending and receiving information (or sharing contents) between a plurality of navigation apparatuses 20 (that is, apparatuses for sending and receiving information with wireless communications according to the present invention) each having the structure described above.

Figure 2:
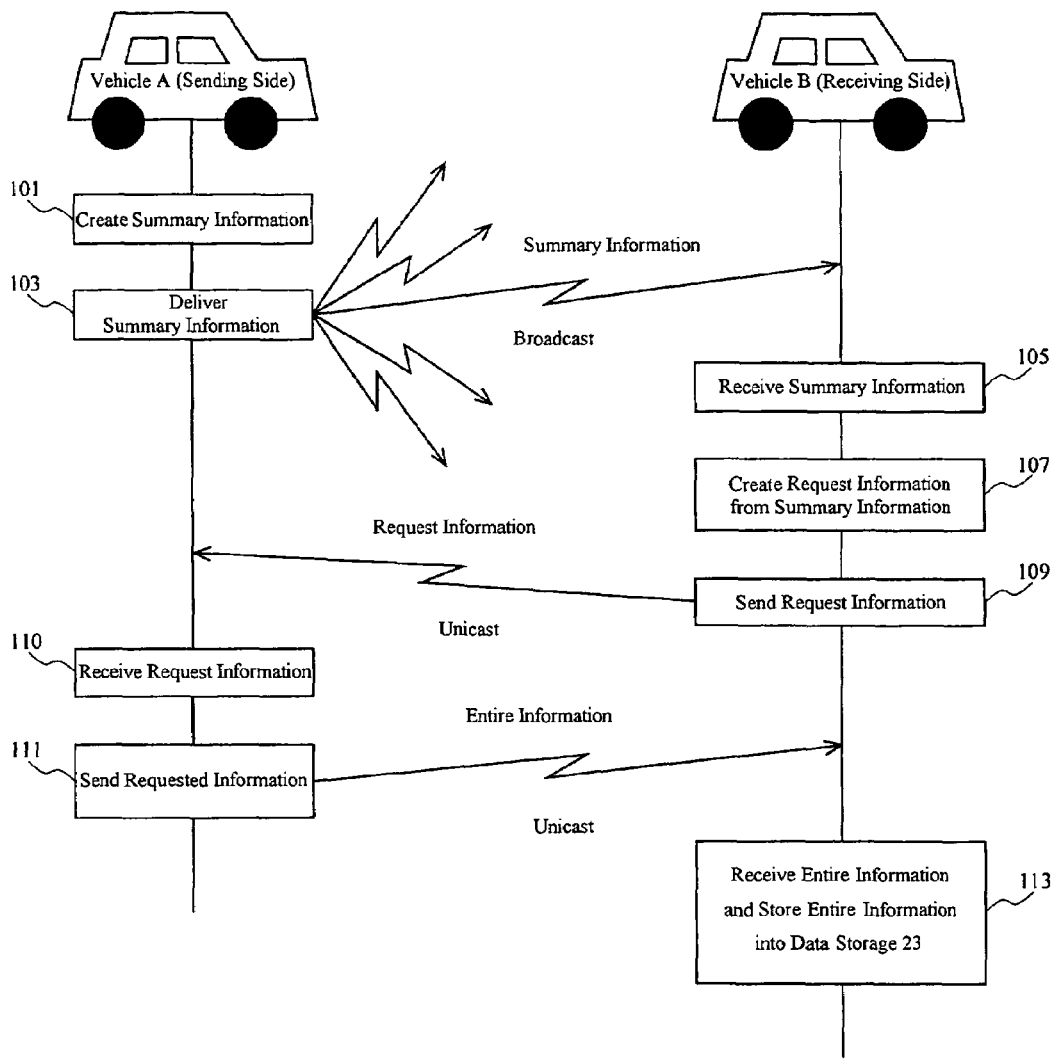
FIG. 2 is a flowchart showing steps for sending and receiving contents (information) between two apparatuses for sending and receiving information with wireless communications which are respectively mounted on an information sending side vehicle and an information receiving side vehicle.

FIG. 2 is a flowchart showing steps for sending and receiving contents (information) between two apparatuses for sending and receiving information with wireless communications which are respectively mounted on an information sending side vehicle (that is, vehicle A) and an information receiving side vehicle (that is, vehicle B). The case where the apparatus (navigation apparatus 20) of the vehicle A (hereinafter, the apparatus A will also be referred to simply as the "vehicle A") sends contents (information) to the apparatus (navigation apparatus 20) of the vehicle B (hereinafter, the apparatus B will also be referred to simply as the "vehicle B") will be described using FIG. 2. However, since each of the apparatuses A and B is equivalent except for difference of contents held in each apparatus, any apparatus can become both the information sending side apparatus and the information receiving side apparatus of contents. Therefore, each of the apparatuses can carry out operations similar to the apparatus of the vehicle B as well as operations similar to the apparatus of the vehicle A.

A method of sending and receiving contents (information) in the present embodiment starts from the disclosure of sendable contents that the apparatus A of the vehicle A holds (that is, stored in the data storage 23 of the navigation apparatus 20 of the vehicle A) to a plurality of apparatuses of other vehicles N (arbitrary vehicle) which reside in an area where the CPU 21A of the vehicle A (hereinafter, codes A and B are respectively added to the components of the navigation apparatuses 20 of the vehicles A and B) can communicate with other apparatus using a wireless LAN. The CPU 21A of the information sending side vehicle A carries out (executes) the summary creating program 22b to create summary information for disclosing the sendable contents (information) (Step 101). Namely, the vehicle A obtains summaries of all or a part of the contents (information) stored in the data storage 23A thereof from the summary file 23e and then creates the summary information from the summaries thus obtained and the IP address of the vehicle A stored in the IP address 23f.

In the case of obtaining a part of summaries of all the held (stored) contents, there are two method including a method of obtaining a part (one or more categories) of contents in all content categories such as traffic information contents, image information contents (including movie information), music information contents, context information contents, and advertisement information contents, and a method of obtaining only contents each having higher priority in all the contents regardless of the types of contents.

Such priority is determined on the basis of the types of contents, classification of contents (that is, classification in the same type contents), or the like, and the user can set them up freely. Further, in the case of the music information contents or the image information contents, for example, the priority set at each of the information delivering centers (the apparatus for sending and receiving information with wireless communications such as a server placed on a fixing location other than vehicles) that first deliver such contents to any vehicles and the priority set by the user of the apparatus which has obtained such contents may be used.

The priority of each type of the contents may be set. As a default configuration, for example, the priority of the traffic information contents is highest, and subsequently each priority places in the order of the music information contents, the image information contents, the context information contents, and the advertisement information contents. The user can change such priority after the priority of each type of contents.

In the traffic information contents, the music information contents, the image information contents, and a part of the context information contents (such as news display contents), there is in-type priority available only in the type or classification of contents. For example, the date and time when the contents have been delivered from the corresponding information delivering center are set as the priority. In this case, the newer the contents are, the higher priority the contents have. In place of the date and time, each priority can be set in the order of preference that the user hopes to deliver the contents.

As for the priority of initially delivering date and time, the priority set in the corresponding information delivering center, and the expiration date of the contents, and the like, which are used when creating a part of the summaries to be delivered, the information (data) included in each of the contents is utilized.

In this regard, in the case where summaries of a part of the contents to be delivered are determined on the basis of the priority thereof, there is a possibility that low-priority information cannot be delivered. Thus, when determining the summaries of a part of the contents to be delivered, only high-priority summaries are not constantly selected, but a delivering ratio of each of the summaries may be changed on the basis of the priority thereof. For example, the apparatus may be constructed so that the contents each having any one of first priority to n'th priority are delivered every time, the contents each having any one of (n+1)'th priority to (n+p)'th priority are delivered at a ratio of one third, and the contents each having any one of (n+p+1)'th priority or more priority are delivered at a ratio less than the ratio described above. However, the contents of which values drop significantly as the time goes by (for example, traffic information contents, and weather information contents) have to be excluded.

The summary of each of the contents mainly includes header information and bibliographic matters of each of the information contents. For example, each type of summaries is constituted as follows.

The summary of the traffic information contents is constituted from the date and time thereof and the location (or area) thereof. In this regard, traffic line information may be added to the component of the summary.

The summary of the music information contents is constituted from a title, and a category (for example, Japanese enkas, pops, rocks or the like). In this regard, in the case of the music information contents, a part of the actual information, for example, executable actual music data for first t1 seconds may be added to the summary thereof.

The summary of the image information contents is constituted from a title, a type of image (for example, a still image, a moving image), and a category (for example, drama, Japanese pictures, Western pictures in the case of movies). In the case of the image information contents, a part of the actual information, for example, a first few still pictures in case of a photograph collection or displayable actual movie data for first t2 seconds in case of moving picture may be added to the summary thereof.

The summary of the context information contents is constituted from a document name, a classification (for example, news document, fiction) and a category (for example, history, mystery, pure literature).

The summary of the advertisement information contents is constituted from a title and a category (for example, foods, clothing, movies, music, books).

Each of the summaries is obtained by extracting all the summaries or a part of the summaries stored in the summary file 23e. Then, the summaries are stored in the summary file 23e as follows. The contents that the apparatus oneself holds in its data storage 23 and the contents received from the information delivering center are stored in the summary file 23e of the data storage 23 after creating the summary thereof.

On the other hand, as for the summaries of the contents received from the other apparatus that delivers the summary information by being requested to send the contents to the apparatus, the summaries included in the delivered summary information are stored in the summary file 23e. In the case where inherent summaries set at the delivering side apparatus are included in the delivered summaries, such summaries are deleted. Further, in the case where there are any inherent summaries to be set at the receiving side apparatus, the inherent summaries set on the basis of the contents obtained by requesting to receive the summaries are added.

When the sending side vehicle A create the summary information in the manner described above, the CPU 21A of the apparatus A (that is, the navigation apparatus 20 mounted on the vehicle A) delivers (sends) the created summary information to a plurality of other apparatuses (vehicles), which reside in an area where wireless communications can be carried out, with the broadcast communications according to the data transmission program 22g (Step 103). The delivery of the summary information is regularly carried out every predetermined time interval. In the case where the vehicle A receives request information (described later) from many vehicles when the vehicle A sends the summary information regularly at normal times, the time interval for delivering the summary information may be set to longer.

On the other hand, the receiving side vehicle B receives the summary information delivered from the vehicle A (Step 105), and stores it in the RAM (not shown in the drawings) temporarily. Then, the CPU 21B of the vehicle B executes the request creating program 22d to create request information on the basis of the summaries in the summary information (Step 107). More specifically, the CPU 21B of the apparatus B (that is, the navigation apparatus 20 mounted on the vehicle B) creates a request against the other apparatus (in this case, the apparatus A of the vehicle A) to send entire information of one or more summaries in the received summaries by comparing the summaries received from the vehicle A with the summaries stored in the summary file 23e of the vehicle B to extract the one or more summaries of which entire information (contents) is not stored in the summary file 23e of the receiving side vehicle B. In the request to send the entire information, request order is determined on the basis of order of new things, order of preference, and order of priority. Then, the CPU 21B of the vehicle B creates request information from the created request and an IP address of the receiving side apparatus B read out from the IP address 23f thereof.

In this regard, in the case where there is a summary in association with incomplete identification (described later) in the summaries of the received summary information, this summary is extracted as an object of the request. In this case, the CPU 21B of the vehicle B gives priority to the summary to which the incomplete identification is added. Receiving point information on a point for consecutively receiving the information corresponding to the summary with the incomplete identification that indicates a portion to be consecutively received in the corresponding entire information (that is, the remaining portion of the information) is added to the request information in this case in addition to the summary of the requested information (contents) and the IP address of the receiving side apparatus B.

The receiving side apparatus B sends the request information to the sending side apparatus A as soon as the apparatus B creates the request information (Step 109). More specifically, the CPU 21B of the apparatus B reads out the IP address of the apparatus A that has sent the summary information from the summary information temporarily stored in the RAM, and then sends the request information to the apparatus A with unicast communications using the IP address of the apparatus A. The sending of the request information is carried out according to the data transmission program 22g. In this regard, timing of sending the request information may be staggered during congestion of wireless communications when the communication traffic with the wireless LAN is large.

In this regard, on creating and sending the request information, separate request information to each of the summaries is created and sent in turn with respect to request order of each of the summaries to be requested. More specifically, the apparatus is constructed so as to send next request information to the other apparatus as soon as the entire information corresponding to the previous request is received. However, the apparatus may be constructed so as to create request information from the IP address of the apparatus and a list of the information corresponding to all the summaries to be requested, in which the list is created on the basis of the request order. In this case, the sending side apparatus A sends the requested entire information in the order of the summaries included in the request information.

The sending side apparatus A having the specified IP address receives the request information sent from the apparatus B (Step 110). The sending side apparatus A that received the request information reads out the contents (entire information) corresponding to the requested summaries in the request information from the data storage 23A of the apparatus A. Then, the apparatus A sends the read-out contents (entire information) to the receiving side apparatus B having the IP address included in the received request information with unicast communications (Step 111). In this case, as for a method of sending the entire information, a stream form (streaming) in which data (information) is sent from the beginning thereof, and a block form (or packet form) in which data (information) is divided into properly-sized blocks (or packets) may be mentioned, for example.

The receiving side apparatus B receives the requested entire information (contents) that the sending side apparatus A sent in response to the request, and stores it into the corresponding information file of the data storage 23B as well as the apparatus B stores the summary temporarily stored in the RAM into the summary file 23e (Step 113).

Hereinafter, in the case where there are other contents (information) to be requested, the apparatus B creates subsequent request information from the summary having subsequent priority and the IP address of the apparatus A (Step 107), and the processing between Step 107 and Step 113 is repeated while the vehicles can communicate with each other.

Meanwhile, in the case where the vehicle mounting the apparatus thereon moves with respect to other vehicle or an information delivering center, the communication between an information delivering center and an apparatus mounted on a vehicle as well as the communication between two apparatuses each mounted on a vehicle may be terminated (interruption of the wireless communications may occur) because the vehicle or vehicles move outside the area where they can communicate with each other while the vehicle receives the requested entire information (contents). For example, in the case where the receiving side apparatus B requests the same sending side apparatus A to send a plurality of contents (information) in turn (in this case, the apparatus B may request the apparatus A to send the plurality of contents at a time), the wireless communications may be terminated because the apparatus A moves outside a sendable area to the apparatus B while the apparatus B receives the requested entire information (contents). Next, a description will be given for the case where the wireless communications are terminated while receiving the requested entire information (contents).

Figure 3:
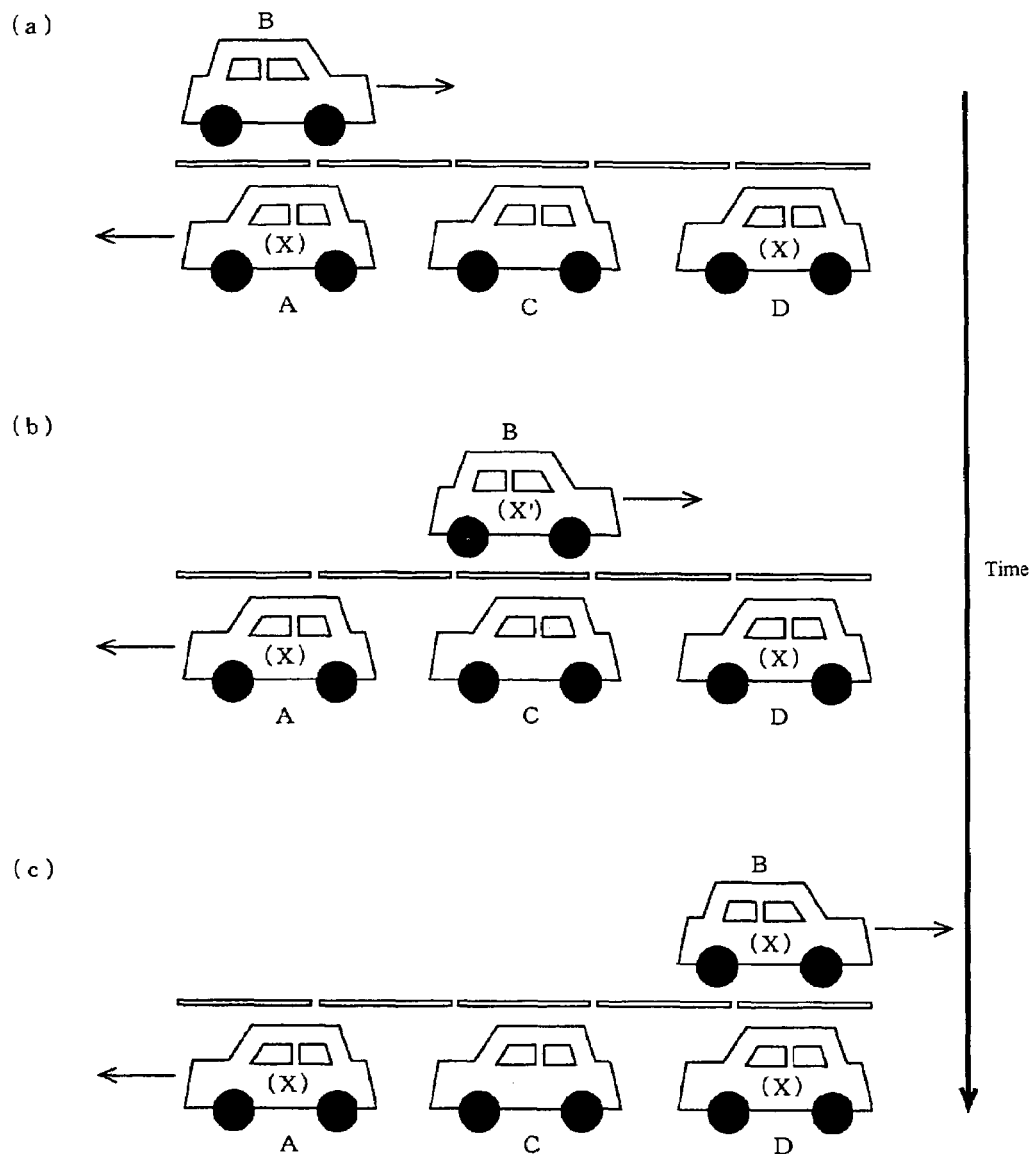
FIG. 3 is a schematic view explaining a phenomenon in which the apparatus receives the remaining contents completely in the case where interruption of the wireless communications occurs when receiving the contents (information).

FIG. 3 is a schematic view explaining a phenomenon in which the apparatus B receives the remaining portion of the requested information (contents) completely in the case where interruption of the wireless communications occurs when receiving the contents (information). FIG. 3 shows so that time goes by from the state shown in FIG. 3(*a*) to the state shown in FIG. 3(*c*). As shown in FIG. 3(*a*), when the vehicle A having contents (information) X first delivers summary information (Step 103), the vehicle B that receives the summary information sends request information for the contents X to the vehicle A (Step 109). Then, when the vehicle A sends the contents X (requested entire information) to the vehicle B in response to the request (Step 111), the vehicle B receives the contents X from the vehicle A (Step 113).

At this state, as shown FIG. 3(*b*), interruption of the wireless communications occurs suddenly before completely receiving the contents X because the vehicles A and B respectively move in the forward and backward directions. In this case, the receiving side apparatus B does not delete the contents X' that the apparatus B has been already received, but stores the contents X' into the data storage 23. Further, the apparatus B also stores a summary of contents X' (that is, a summary of contents X) that has been already received to which incomplete identification indicating that the stored information is incomplete and receiving point information on a point for consecutively receiving the contents X are added into the summary file 23*e*. In this regard, the receiving point information itself may be used as the incomplete identification.

Since an apparatus C of a vehicle C does not have (possess) the contents X as shown in FIG. 3(*b*), there is no summary of the contents X' (that is, contents X) in the summary information received from the vehicle C. Thus, the vehicle B sends a request for contents and receives the same only in the case where there is a request object in the summary information received from the vehicle C other than the contents X.

Subsequently, since an apparatus D of a vehicle D has the contents X as shown in FIG. 3(*c*), a summary of the contents X is included in the summary information received from the vehicle D. Thus, a CPU 21D of the apparatus D compares all the summaries received from the vehicle D with the summaries stored in the summary file 23*e*, and creates request information for the contents X corresponding to the summary because the summary to which the incomplete identification is added corresponds with the summary in the received summaries. As described above, the request information in this case is created so as to include the receiving point information in addition to the summary and the IP address of the receiving side apparatus B (Step 107). The apparatus B sends the created request information to the apparatus D of the vehicle D with unicast communications (Step 109), and receives a remaining portion of the contents X (remaining contents X") from the vehicle D (Step 113). The apparatus B that received the remaining contents X" stores the remaining contents X" of the contents X (=X–X") into the data storage 23B together with the contents X' that has been already received. The receiving side apparatus B then deletes the incomplete identification and the receiving point information that has been added to the summary, and terminates the reception of the contents X.

Figure 4:
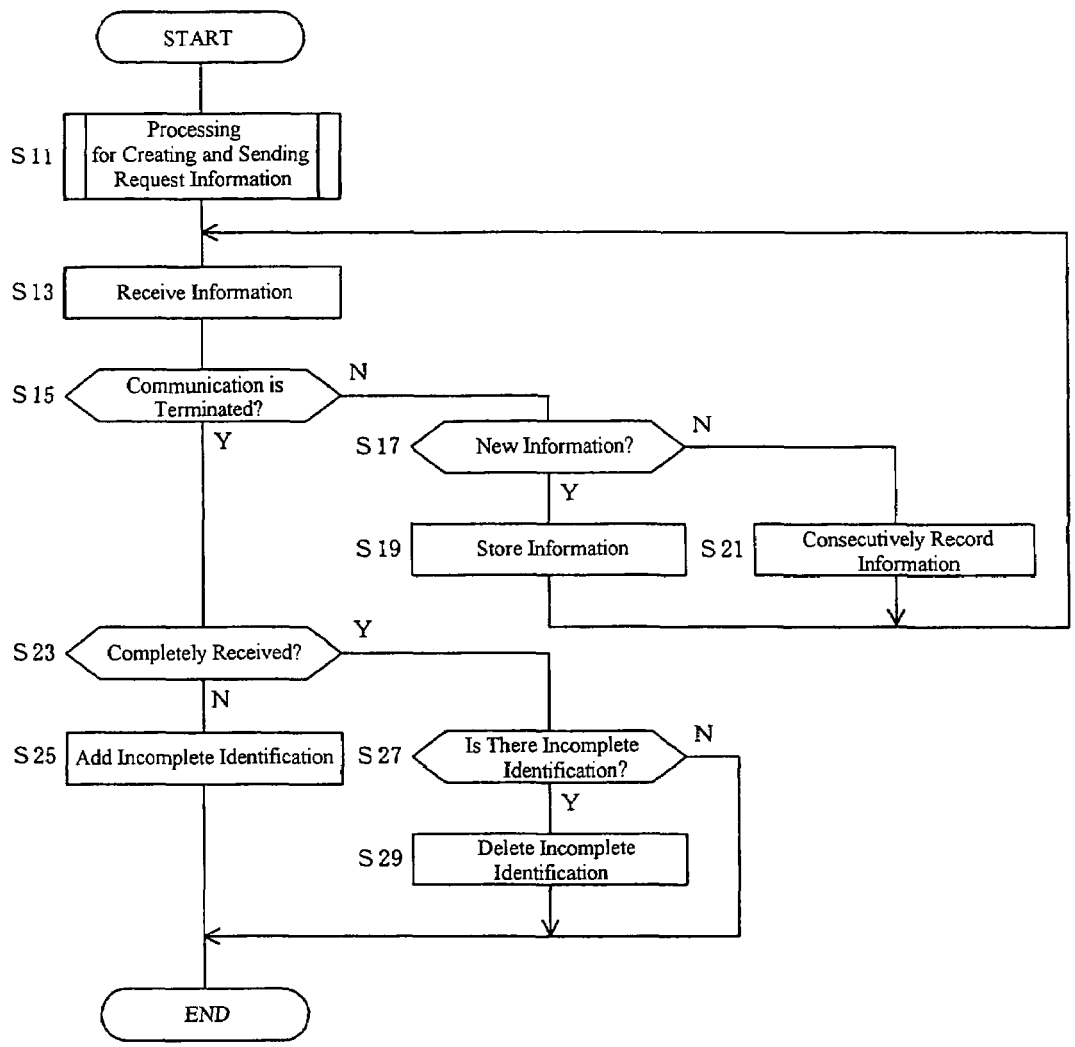
FIG. 4 is a flowchart showing the processing in which the receiving side apparatus receives contents (information) from the sending side apparatus on the basis of the received summary information in the case shown in FIG. 3.

Next, a detail description will now be given for processing, in which the receiving side apparatus B receives contents (information) from the sending side apparatus A or the like on the basis of summary information received from the apparatus A or the like, with reference to a flowchart of FIG. 4. FIG. 4 is a flowchart showing the processing in which the receiving side apparatus receives contents (information) from the sending side apparatus on the basis of the received summary information in the case shown in FIG. 3. In this embodiment, the processing shown in FIG. 4 is carried out by the CPU 21B of the apparatus B on the basis of the request creating program 22*d* and the data transmission program 22*g*.

The CPU 21B of the receiving side apparatus B carries out the processing for creating and sending request information on the basis of the received summary information (Step 11). This processing corresponds to the processing from Step 105 to Step 109 of the flowchart in FIG. 2.

Subsequently, the CPU 21B of the receiving side apparatus B receives contents (information) that the sending side apparatus A sends in response to the request via the wireless communication device 35 (Step 13). In the case of obtaining incomplete data again, the apparatus B receives information (contents) from next portion of the contents that has been already received using the stream form (streaming), and alternatively receives the contents of non-received blocks (packets) using block form (or packet form). At that time, the sending side apparatus A sends such contents on the basis of the receiving point information of the request information from the receiving side apparatus B.

The CPU 21B determines whether or not the wireless communications are terminated (Step 15). The CPU 21B determines that the wireless communications are terminated in the case where interruption of the communications occurs while receiving data or the case where the reception of all data of the contents is completed.

In the case where it is determined that the communications are not terminated, the CPU 21B determines whether or not the received data is new data (new contents) (Step 17). The determination by the CPU 21B can be carried out by obtaining data name during data transfer or contents of data before data transfer, for example. In the case where it is determined that the received data is new data ("Yes" as Step 17), the CPU 21B stores the received data as new contents into the corresponding file of the data storage 23B (Step 19), and returns to Step 13 to continue to receive other data.

On the other hand, in the case where it is determined that the received data is not new data, that is, in the case where the received data is a remaining portion of the contents (data) to which incomplete identification is added ("No" at Step 17), the CPU 21B consecutively records (writes) the received remaining data (X" in this embodiment) to the data that has been already received (X' in this embodiment) and stored in the data storage 23B (X(=X'+X") in this embodiment) (Step 21), and returns to Step 13 to continue to receive other data.

In the case where it is determined at Step 15 that the communications are terminated ("Yes" at Step 15), the CPU 21B determines whether or not the requested contents are completely received (Step 23). This determination by the CPU 21B can be realized by obtaining a data length, checksum, a hush value or the like of the data to be received in advance, for example. In the case where it is determined that the contents are not completely received, that is, in the case where interruption of the communications occurs while receiving the data ("No" at Step 23), the CPU 21B adds the summary corresponding to the contents (data) that had been received to incomplete identification and receiving point information (Step 25), and the processing is terminated.

On the other hand, in the case where it is determined that the contents are completely received ("Yes" at Step 23), the CPU 21B determines whether or not incomplete identification has been already added to the summary of the received data (Step 27). In the case where it is determined that the incomplete identification has been added to the summary ("Yes" at Step 27), the CPU 21B deletes the receiving point information and the incomplete identification from the summary (Step 29), and the processing is terminated. On the other hand, in the case where it is determined that the incomplete identification has not been added to the summary ("No" at Step 27), the processing is terminated as it is.

In this regard, in the processing described above, the case where the incomplete identification and the receiving point information are added and deleted to and from the summary to be stored in the summary file 23*e* has been described, but they may be added and deleted in association with other database or the like.

As described above, according to the apparatus for sending and receiving information with wireless communications of the present embodiment, it is possible to obtain following effects.

(1) According to the present embodiment, since the data transmission is carried out with a wireless LAN, it is possible to achieve the apparatus for sending and receiving information with wireless communications easily. Therefore, it is possible to reduce the communication costs, and no developing and operating costs for a server are required.

(2) Since the apparatus is constructed so that the apparatus delivers the summaries of contents that the apparatus possesses to other apparatuses with broadcast communications using the wireless LAN, it is possible to inform a large number of other apparatuses of sendable contents that the apparatus possesses easily.

(3) Further, since the apparatus delivers summaries each of which is a brief explain for contents and is formed from a part of sendable contents before sending the entire information thereof, it is possible to inform other apparatuses of the sendable contents with the small amount of data easily.

(4) Moreover, since the apparatus is constructed so that, in the case where interruption of the wireless communications occurs while receiving the contents (information), the apparatus does not receive a first portion of the contents again but receives only a remaining portion of the contents, it is possible to shorten the time required to obtain the contents again. In addition, it is possible to obtain the desired contents surely even in the case where there is only a relatively short time to communicate between the apparatuses each mounted on a vehicle with a wireless LAN because the receiving side and sending side vehicles move with respect to each other in an area where wireless communications with the wireless LAN can be carried out.

The apparatus for sending and receiving information with wireless communications of the present invention have been described on the basis of preferred embodiment shown in the drawings, but it is to be understood that the present invention is not limited to this embodiment, and respective portions forming the apparatus can be replaced with an arbitrary arrangement capable of functioning in the same manner. Further, any other arbitrary component may be added to the apparatus of the present invention.

For example, in the embodiment described above, the case where the apparatus receives the contents (information) from the other apparatus from which the apparatus received the summary information first if there are a plurality of other apparatuses to which the apparatus can send the request information in the area where the wireless communication can be carried out has been described. However, the apparatus may be constructed to select any one of the plurality of other apparatuses in such a case. More specifically, it is advantage to send the request information to the other apparatus with which the apparatus can communicate for a longer communication time.

Thus, the priority to send the request information to the other apparatus may be determined as follows. In this regard, the case i) is highest priority and the case iv) is lowest priority in these cases.

i) an apparatus of a vehicle that moves in the same direction as that of the receiving side apparatus ii) an apparatus in an information delivering center iii) an apparatus of a vehicle that moves on a road crossing the road on which the receiving side apparatus moves iv) an apparatus of a vehicle that moves in the direction opposite to that of the receiving side apparatus In addition, the priority is determined on the basis of the distance from the receiving side apparatus in the case where there are a plurality of other apparatuses at the same case described above. More specifically, in the case of i), the shorter the distance between the sending side and receiving side apparatuses is, the higher priority the other apparatus has. Further, in the case of iii) or iv), the longer the distance between the sending side and receiving side apparatuses is, the higher priority the other apparatus has.

In the case described above, the sending side apparatus is constructed so as to add current position data of the sending side apparatus and moving direction data indicating the moving direction of the sending side apparatus such as route data to the summary information to be sent. On the other hand, the receiving side apparatus determines the priority on the basis of the received summary information, a current position and a moving direction of the receiving side apparatus, and sends request information to the sending apparatus having highest priority.

Therefore, the apparatus of this embodiment has to be provided with current position obtaining means for obtaining a current position of the apparatus and moving direction determining means for determining a moving direction of the apparatus. However, in the case of the information delivering center that is stationary, no moving direction determining means is required. Further, the current position obtaining means of the information delivering center is constructed so as to store the pre-measured current position thereof into the storage means and obtain that current position by reading out it therefrom.

In this case, the CPU 21 calculates a current position from at least one detection value of the speed sensor 32 and the gyro sensor 33, and the GPS sensor 31, by which the current position obtaining means is achieved. Further, the CPU 21 determines a moving direction on the basis of a plurality of pieces of current position data calculated as described above, by which the moving direction determining means is achieved. In this regard, road data may be further utilized when determining the moving direction.

As described above, according to another embodiment, in the case where the receiving side apparatus can send the request information to a plurality of other apparatuses, the higher priority the other apparatus has, the higher possibility to communicate with each other for a longer time the apparatus and the other apparatus have. Therefore, the cases where the reception of the requested contents (information) is completed without interruption of the wireless communications during the communication are increased, and this makes it possible to heighten (improve) the reception efficiency of the contents.

What is claimed is:

1. An apparatus for sending and receiving information with wireless communications, the apparatus being capable of sending and receiving various information to and from a plurality of other apparatuses for sending and receiving information with wireless communications, the apparatus comprising:

information storage means which stores various information, the various information including contents information of a plurality of different categories to which predetermined priorities are assigned, respectively;

summary creating means for creating a summary of each of the contents information of the different categories stored in the information storage means, the summary being a brief explanation for contents corresponding to each of the contents information of the different categories, wherein the summary creating means creates the summary of each of the contents information of the different categories based on the predetermined priorities;

summary information delivering means for delivering summary information to the plurality of other apparatuses, the summary information to be delivered including at least a part of the summaries created by the summary information creating means and identification data of the apparatus;

request information receiving means for receiving request information from any one of the plurality of other apparatuses which received the delivered summary information, the request information including the identification data of the apparatus contained in the delivered summary information, and the request information also including identification data of the other apparatus and a request to send entire information of one or more summaries in the received summaries that the other apparatus hopes to have entire information thereof; and entire information sending means for sending the requested entire information of the summaries to the other apparatus in response to the request using the identification data of the other apparatus.

2. The apparatus as claimed in claim 1, wherein the one or more summaries are determined in the other apparatus by comparing the delivered summaries with various information stored in information storage means of the other apparatus.

3. The apparatus as claimed in claim 1, wherein the wireless communications are carried out using a wireless local area network.

4. An apparatus for sending and receiving information with wireless communications, the apparatus being capable of sending and receiving various information to and from a plurality of other apparatuses for sending and receiving information with wireless communications, the apparatus comprising:

information storage means capable of storing various information, the various information including contents information of a plurality of different categories to which predetermined priorities are assigned, respectively;

summary creating means for creating a summary of each of the contents information of the different categories stored in the information storage means, the summary being a brief explanation for contents corresponding to each of the contents information of the different categories, wherein the summary creating means creates the summary of each of the contents information of the different categories based on the predetermined priorities;

summary information receiving means for receiving summary information of various information delivered by any one of the plurality of other apparatuses with the wireless communications, the received summary information including identification data of the other apparatus and at least a part of summaries of the various information stored in information storage means of the other apparatus, and the summary information being created by summary information creating means of the other apparatus based on the various information stored in the information storage means thereof;

request information creating means for creating request information, the request information including identification data of the apparatus and a request against the other apparatus to send entire information of one or more summaries in the received summaries to the apparatus, in which the request is created by comparing the received summaries with the summaries created by the summary information creating means of the apparatus to extract one or more summaries of which entire information is not stored in the information storage means of the apparatus;

request information sending means for sending the thus created request information to the other apparatus using the identification data of the other apparatus; and entire information receiving means for receiving the entire information of the requested summaries from the other apparatus.

5. The apparatus as claimed in claim 4, further comprising incomplete information storage means for storing a portion of the entire information that has been already received from the other apparatus as incomplete information in the event that interruption of the wireless communications occurs when receiving the entire information by the entire information receiving means, the incomplete information being stored in the incomplete information storage means in association with incomplete identification that indicates the stored information is incomplete information, wherein the request information sending means requests to send the remaining portion of the entire information to the apparatus when a summary of the entire information of which incomplete information is stored in the incomplete information storage means in association with the incomplete identification is contained in the received summary information.

6. The apparatus as claimed in claim 5, wherein, in the case where a request to send the remaining portion of the entire information exists as well as a request to send the entire information, the request information sending means gives priority to the request to send the remaining portion of the entire information rather than the request to send the entire information.

7. The apparatus as claimed in claim 4, wherein the wireless communications are carried out using a wireless local area network.

* * * * *